Aug. 31, 1948. P. S. MORGAN 2,448,187
WORM AND WHEEL UNIDIRECTIONAL TRANSMISSION GEARING
Filed Feb. 10, 1947 2 Sheets-Sheet 1
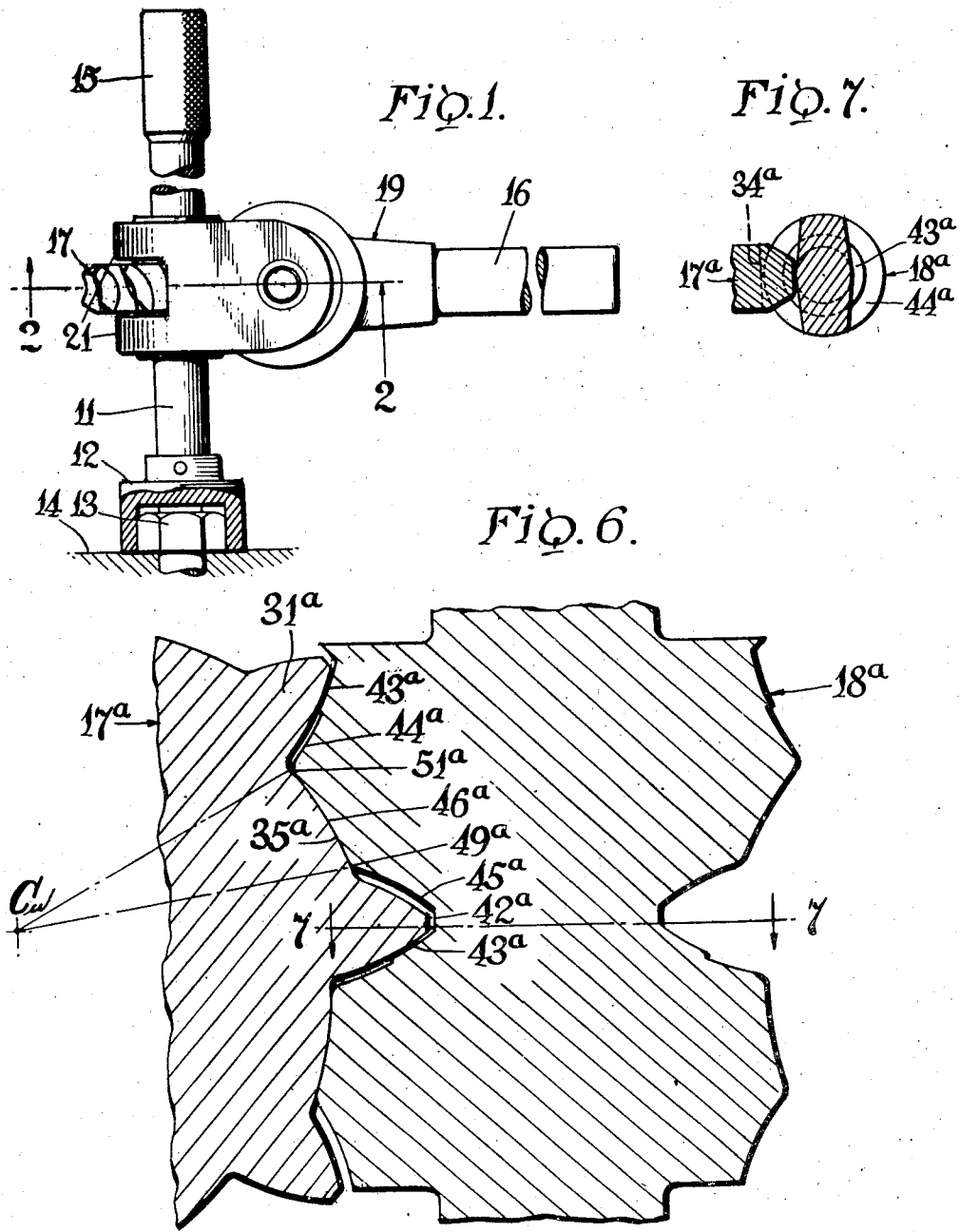
INVENTOR
Porter S. Morgan,
BY Albert R Henry
ATTORNEY Aug. 31, 1948.  P. S. MORGAN  2,448,187
WORM AND WHEEL UNIDIRECTIONAL TRANSMISSION GEARING
Filed Feb. 10, 1947  2 Sheets-Sheet 2
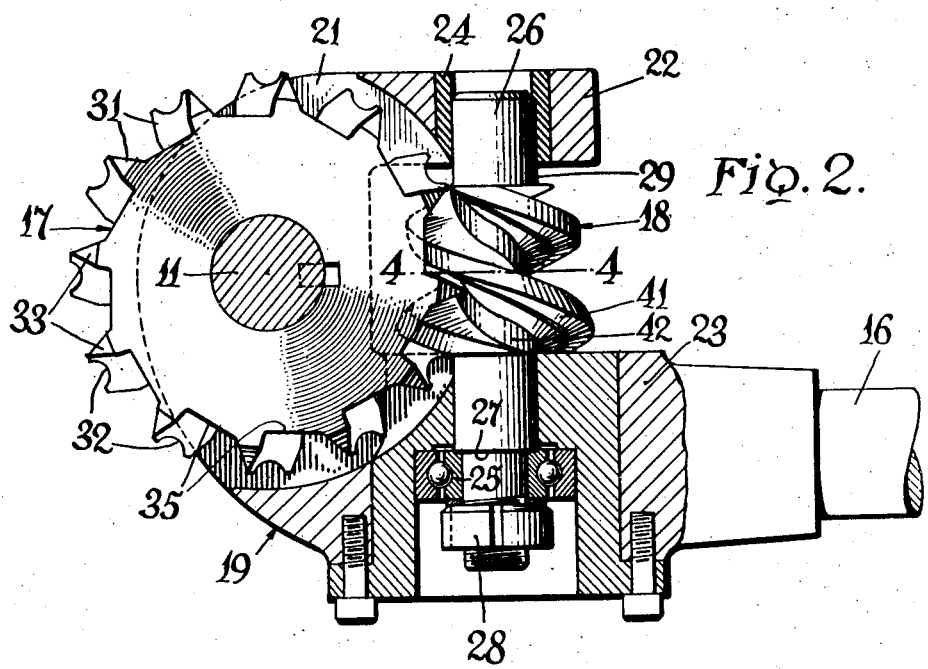
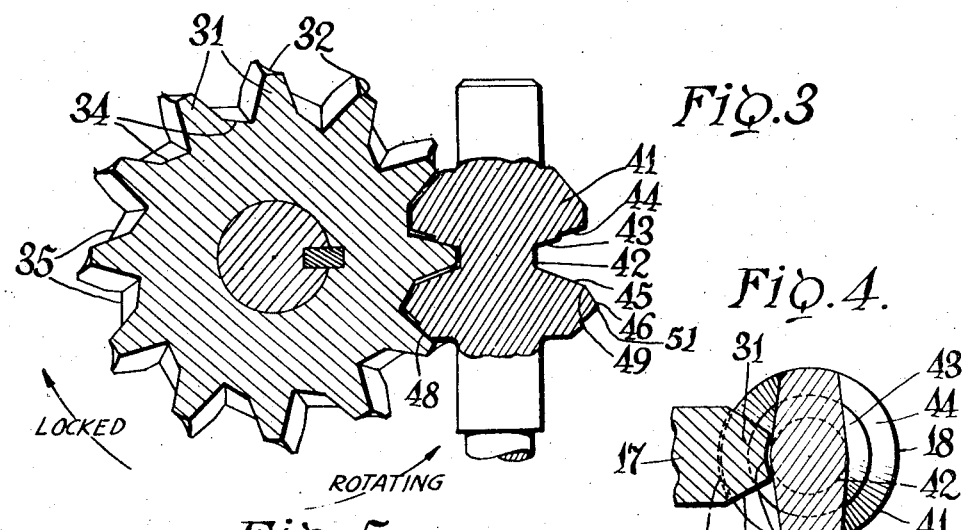
INVENTOR
Porter S. Morgan,
BY Albert R. Lewy
ATTORNEY Patented Aug. 31, 1948

2,448,187

UNITED STATES PATENT OFFICE 2,448,187

WORM AND WHEEL UNIDIRECTIONAL TRANSMISSION GEARING

Porter S. Morgan, Westport, Conn., assignor to The Connecticut Variable Gear Corporation, New Haven, Conn.

Application February 10, 1947, Serial No. 727,496

9 Claims. (Cl. 74—458)

1

This invention relates to a worm and wheel type of gearing, and it has particular reference to the provision of a worm and wheel, adapted to cooperate as a kinematic pair, wherein rotative force applied to the wheel will cause either a corresponding rotation of the worm, or a positive locking between the wheel and worm, depending upon the direction in which the rotative force is applied.

Worms formed with a thread having a low helix angle will, when acting as the driving member, transmit rotative motion to the meshing wheel; but when the wheel is made the driver, the large frictional force causes the thread and teeth to bind. Hence one frequently hears the statement that a worm gear is "irreversible." At the same time, if a large helix angle is employed, of say 45°, the wheel, upon being rotated, will cause rotation of the worm, and in this case it is said that the gearing is "reversible." I have heretofore proposed a "reversible-irreversible" worm and wheel pair wherein the condition is such that the wheel may drive the worm when rotated in one direction, but will not rotate the worm when the rotative force, applied to the wheel, is in the opposite direction.

My present invention is directed toward gearing of the "reversible-irreversible" category. In practical form, it contemplates a worm having a thread adapted, upon one rotative engagement with the wheel teeth, to contact through a reversible helix angle, thereby to impart to the worm a positive rotary movement. It further contemplates the engagement of the thread land or top with the bottom spaces between the wheel teeth, when the wheel is rotated in the opposite direction, thereby providing a positive wedging and locking action between the elements of the pair, so that relative rotation is prevented. Such engagements, at different zones, is effected by suitably relieving the teeth and threads on those portions which otherwise would contact to interfere with the desired engagement.

In the gearing of the present invention, the forces transmitted from wheel to worm, when the rotation causes engagement of tooth bottom and thread land, are essentially directed parallel and normal to the worm axis, and there is only a negligible component which can be considered as tending to impart any rotative effort. In this respect, the action is distinguished from that occurring in the "irreversibility" of the conventional small helix angle worm. The cooperating bottom and land surfaces form, in one aspect, friction or wedging surfaces, such as one may consider as existing in a cone clutch, which distribute the applied force over a large braking area to hold the worm from any rotative tendency. This braking surface, to follow the analogy to the cone clutch, is best disposed at an angle to the axis of the wheel, so chosen as to provide a suitable balance between the helix angle and the wedging force desired.

With a worm and wheel pair of this nature, there is provided an efficient kinematic pair through which the transmission of large units of power may be effected with gearing of relatively small dimensions, and wherein, by means of the rotary ratchet effect which may be obtained, transition from locking to mutual rotation may be effected at high speed. The invention is thus applicable to various machines or mechanisms in which such effect is desired.

A further significant feature of the present invention resides in the applicability of conventional gear shaping practices to the formation of the worm and wheel, thereby reducing manufacturing costs. Various other features and advantages will appear from the following detailed description of typical embodiments, illustrated in the accompanying drawings, wherein:

Fig. 1 is an elevation of a ratchet wrench in which the novel gearing is incorporated;

Fig. 2 is an enlarged section on the line 2—2 of Fig. 1, with the worm and wheel in elevation;

Fig. 3 is a medial sectional view of the wheel and the thread of the worm;

Fig. 4 is a section taken substantially on the line 4—4 of Fig. 2, showing the relative positions of the teeth and the thread;

Fig. 5 is an elevation of the wheel;

Fig. 6 is an enlarged fragmentary view of a modified form, showing the relative locations of the thread and teeth elements; and, Fig. 7 is a reduced section taken substantially on the line 7—7 of Fig. 6.

Referring first to Fig. 1, there is shown a simple machine, in the form of a ratchet wrench having a spindle 11 connected to a socket 12 at one end, which is adapted to engage a screw bolt 13 entering a fixed member 14. The spindle is held on the work by a manually engageable handle 15, and rotation of the spindle is effected by a back and forth motion of the operating arm 16. The spindle 11 has keyed thereto a worm wheel 17, which is in mesh with a worm 18 (Fig. 2) carried in a housing 19 which is fixed with respect to the arm 16. When the arm 16 is rotated in one direction, as, for example, down into the plane of the paper, the worm turns freely about the relatively fixed wheel 17, thus corresponding to a condition of the wheel acting as a rotary driver for the worm. When the arm 16 is pulled up, the worm and wheel become locked, and no relative rotary motion occurs between the wheel and the worm. The wheel 17 and spindle 11 are then constrained to rotate in unison with the arm 16, thus transmitting the input power to the driven member 12.

These effects of free rotation or locking are accomplished by the manner in which the worm and the wheel are formed and organized with respect to each other. The example just given is, of course, intended simply to typify the resulting action, and it will be readily understood that the spindle 11 may be considered as being any driving or driven member, while the arm 16 may be taken as any driven or driving member, organized through any suitable linkage or mechanism into a machine.

Referring next to Fig. 2, the housing 19 is shown as being formed with bifurcated arms 21 disposed on either side of the keyed wheel 17, and rotatably mounted with respect to the wheel and the spindle 11. The worm 18 is mounted to mesh with the wheel by means of bosses 22 and 23, each of which is bored to receive a bearing, 24 and 25 respectively, for the ends of the worm shaft 26. Due to the way in which the gearing of the particular illustration is organized, the bearing 24 is a simple bushing, while the bearing 25 is a combined radial and thrust ball bearing, mounted against a shoulder 27 on the shaft 26, and secured by a lock nut 28. A space 29, positioned on the worm shaft 26 between the bearing 24 and the worm thread proper, serves to permit correct adjustment or proper positioning of the worm 18.

From the elevational illustration of the worm and wheel in Fig. 2, it will initially appear that the wheel 17 is formed with helically disposed teeth 31 formed with top round 32 to embrace the worm thread, and with side taper 33, as has been customary in wheel design. The wheel is illustrated in the other elevation in Fig. 5, wherein, by the use of shade lines, it appears that the bottom spaces 34 are cupped transversely, that is, with respect to the pitch plane. It will be noticed, however, from Fig. 3, that the outer edges 35 of the bottom spaces are straight lines, and in this particular form, it is proposed that such straight line condition may occur at any section through the wheel. Modifications of the wheel (here shown as a twelve tooth or 30° circular pitch gear) from conventional design, will be pointed out hereinafter.

Referring next to the worm 18, it is herein illustrated as a double thread worm whose thread 41 progresses around the bottom diameter in such fashion as to provide thread roots or bottoms 42. The thread itself is also cut with a high helix angle adjacent the root, so that such portion of the thread is reversible. The actual value of this angle may, of course, vary. I consider that any angle of more than 25° is operative as a high or reversible angle, although even lower angles may be used under special conditions. A helix angle of 45° is universally considered a rather high helix angle, having due regard to cutting methods. In the embodiment of the invention from which the instant illustrations were prepared, the helix angle at the thread root measures to approximately 42°, while the angle at the thread top measures approximately 20°. As with the teeth of the wheel, the thread may initially be cut with regular involute profiles.

To this point, I have somewhat emphasized the similarities of the wheel and worm to types heretofore known, as a means of conveying, to those skilled in the art, the facility with which the elements may be fabricated by customary practices. Obviously, from what was stated at the outset, there are significant modifications and departures, and these will now be explained.

Referring primarily to Fig. 3, it will be seen that one face of the worm thread 41 rises from the root 42 into the high helix angle portion 43, which, at the addendum section 44, is ground back or relieved to interrupt the contact which otherwise could occur with the wheel teeth flanks. The opposite thread face 45 is also relieved substantially throughout its extent from the root to the top, again removing the unwanted contact area which otherwise would be present. The thread tops 46 are shown as having finite length with a straight line trace, the angularity of which, with respect to the worm axis, progressively changes with the thread between leads. The tops 46 are angularly disposed to the threads 44 and 45 at all sections.

Considering next the wheel teeth 31, it will be seen with respect to the instantaneous position of Fig. 3, that their addendum portions have engaged with the high angle thread portion 43, but, due to the relief 44, there is no contact at the thread addendum on the driving side. Likewise, the relieved thread face 45 and the adjacent portion of the tooth have clearance. The bottom spaces 34 lie parallel (or practically so) to the tooth tops 46, but these areas are out of contact, and similarly the tooth lands have clearance with the thread root. The contacting portions of the teeth with the reversible thread portion 43 will be denoted by the reference numeral 48.

It may be inferred by some, from initial inspection of the figures, that the teeth 31 are not strictly in proportion, insofar as thickness is concerned, to the conventional relationships. This indeed may be the actual case, within the principles of the invention. What is desired is a tooth bottom space, substantially coextensive with the length of the thread land of the worm, and in cooperation with the relief between certain portions of the thread and teeth, as heretofore explained. Obviously, such relief and proportioning may be obtained by cutting back the teeth, as well as the thread, or parts of one and parts of the other. Considerations of ultimate strength of the parts and production practices may control such modifications.

The action, or mode of operation, for the condition shown in Fig. 3, may now be analyzed. Assuming, with respect to Fig. 1, that the input arm 16 is pushed into the plane of the paper, then worm 18 will be carried bodily with it, or in a clockwise direction as viewed in Fig. 3. This motion will cause the addendum portions 48 of the wheel teeth to engage the high helix angle dedendum portions 43 of the worm thread, clearance being established at other regions of possible contact. The worm accordingly will rotate on its own axis between the bearings 26 and 27, any minor thrust or load incident to this free motion being taken by the bearings. In the example assumed, the load is negligible, being that required to rotate only the worm itself as a freely running member.

The same effect will obtain if, assuming the arm 16 to be held stationary, the wheel 17 is rotated in a counterclockwise direction, as viewed in Figs. 2 and 3. Due to the mutual contact of thread portions 43 and tooth portion 46, such rotation of the wheel will impart rotation to the worm on its own axis. This, therefore, is the condition for "reversibility" of the drive between the wheel and the worm.

Let it next be considered that the rotation of the wheel 17 is clockwise, or, for equal effect, the worm 18 is advanced counterclockwise around the wheel 17 (see Fig. 3). The reversible thread portion 43 accordingly advances ahead of or away from the addendum portion 46 of the teeth, and, but for the relationships herein established, contact would occur between the teeth faces opposed to the faces 46, and the portion 45 of the thread, as in a conventional worm-gear combination. The conditions are such, however, that before the wheel teeth can make driving contact with the thread portion 45 of the worm, the bottom spaces 34 contact and wedge against the thread lands 46. The worm and wheel then become mutually interlocked, and rotary motion between them cannot take place.

By further inspection of the figures, it will be seen that a "point" on the tooth bottom, swung from a radius at the wheel center, would try to progress further into the thread land as such point advances from junction 49 (between lines 45 and 46) to point 51 (the terminus of the tooth top 46). Remembering that the action of such point is repeated over the entire contacting areas between tops and bottoms, it will be seen that there is created a pad, or region, which acts as a braking surface against any possible rotative force which may be assumed to be present. It will be seen that this locking effect is therefore not comparable with the binding action of low helix angle "irreversible" worms, but is effected by the creation of definite braking or clutching areas between the tooth bottoms and the thread lands. Not only does this relationship provide a very positive lock, but it also facilitates the manufacture of a unidirectional worm and wheel pair. The angularity of the braking areas with respect to the worm wheel radii will, of course, have an effect on the amount of braking force. A more effective force is created if the angularity is increased to a finite value of several degrees, as shown in the drawing. In this case, the mean value of the inclination of the braking area to a radius from the wheel center is approximately 15°, which has been found an efficient value in co-operation with the helix angle employed at the outer extremities of the worm teeth faces. With a higher helix angle at the outside of the worm, a lower inclination may be employed with equal effectiveness.

It may also be pointed out, in connection with these figures, that while the high helix angle thread section 43 is preferably disposed adjacent the root, the actions herein discussed can be effected (although less efficiently) when such high angle portion extends into the addendum portion of the thread.

The transverse section of Fig. 4 further illustrates the relations between the thread and tooth components, as will be apparent to those skilled in the art.

Attention may next be directed to the modified form of wheel tooth and worm thread shown in Figs. 6 and 7. Fig 6 is on an enlarged scale to facilitate its consideration, while the transverse section of Fig. 7 is on a reduced scale. Reference has just been made to the "mean" angle between the bottoms 34 and top lands 43 when the parts are regarded in locked relationship. In pure theory, and with respect to the elements of Fig 3, this condition contemplates that a straight line in the bottom contacts throughout its length with a corresponding straight line on the tooth top land as a result of a very small angular movement. Thus, the "point" which was considered as attempting to enter the worm body, lies in a radius which may make an angle at the junction 49 of say 7½°, and, as the radius continues its rotation, it may include an angle of say 22½° at junction 51.

A worm wheel pair, so constructed, is entirely operative. It may, however, be modified so that the angle between the "point" radius, and its intersected portion of the tooth bottom and thread top, is substantially a constant. Such a construction has several advantages over the embodiment first described. In the modified case, the lines in the surfaces of the tops and bottoms become parallel curves, and they will contact, under conditions of center misalignments, throughout their available extent. Hence, a constant pressure angle, and therefore a force transmitting factor, can be more precisely predetermined, and the engineering design problems presented in transmission gearing can be more easily solved.

The wheel 17a, having a center at $C_w$, is shown as a nine tooth gear having stub teeth 31a with involute or other known profile, adapted to engage the multiple thread worm 18a through addendum portions 48a and high angle thread portions 43a, in the manner heretofore explained. Reliefs between the portions 42a at thread root, the opposite thread face 45a, and the regions 44a are provided in like fashion.

The structural modifications are, that the tooth bottoms 34a are no longer cupped (see Fig. 7); the bottoms have been increased in circumferential length as compared to standard helical gear practice, and the top round has been substantially eliminated. Particularly, it will be noted that the bottom edges 35a, and the tooth tops 46a, have been changed from straight lines to curves. The parts are shown with these portions in contact.

As I have endeavored to explain hereinabove, in general, when a radius swung from a center such as $C_w$, cuts through a line or curve spaced from the center (such as the tooth bottom or worm top), the radius and line will, at the successive points of intersection, include an angle whose value changes as the radius moves. This general condition will hold true, in the absence of some special factor, which may be considered to be one of the following:

First, if the intersected line is a circle, struck from the same center $C_w$, then the radius and tangent form a constant angle of ninety degrees, since this is a definitive condition for a circle. However, the circular arc is not here to be desired, inasmuch as it would not provide the desired wedging and locking action.

Second, the intersected line may be considered to be a curve whose tangents at the points of intersection form a constant angle with the radius, and which curve must differ from the circle in one or both of the factors that the constant included angle differs from ninety degrees, or the radius is a variable.

Third, the intersected line is a curve which, while not mathematically identical with the curve of the second assumption, is so near to it, as a practical matter, that it may be considered as being substantially the same thing.

Without attempting an exhaustive mathematical discussion, I am advised by reference to standard works that the curve which makes the desired constant angle with the radius according to the second possibility is called a logarithmic or equiangular spiral, denoted by the general equation:

$$R = k \cdot e^{\theta (\cot \omega)} \quad \text{(Eq. 1)}$$

where

R is the generating radius vector for the curve.
$k$ is a constant;
$e$ is the Naperian logarithmic base;
$\theta$ (theta) is the total angle through which the radius has progressed; and
$\omega$ (omega) is the angle between the radius and the tangent to the curve at the point of intersection.

The expression may be more simply written as:

$$\log R = a \cdot \theta \quad \text{(Eq. 2)}$$

where $a$ is the constant determinable from any assumed set of conditions.

That the expression appears applicable here has been ascertained by graphically laying out tangents over the bottom space between adjacent tooth roots, so as to make a constant angle of 90° plus 15° with radii from point $C_w$. The equation just given was then plotted from calculations based on the same value for the included angle $\omega$, from which it appeared that the graphically developed curve, and the mathematical curve, coincided.

Hence, the tooth bottom spaces, and the worm top lands, should, from the foregoing, be so formed that, in section, they appear as curves of, or approximating, the foregoing nature. When this condition obtains, then these areas will contact simultaneously throughout their available extent, even though, due to errors in misalignment of the shaft centers, straight line surfaces would not do so. Further, the pressure angle between the surfaces will be the same at all points of contact. While an angle of 15° has been given as a specific numerical example, that angle, as such, is not critical, for the reasons heretofore given.

The development in practice, with readily available machines and tools, of the mathematically perfect curve just considered, may be a matter of some initial difficulty. In actual practice, it is not essential to adhere to it. Thus, within the limited arcs around the gear wheel where the braking areas are located, there are other forms of curves, so closely approximately the spiral, that they are to all intents and purposes the same thing. That is to say, the line distances between such curves, for gearing of the usual dimensions, may be so small as to be immaterial in producing the desired result. One such curve which approximates the spiral is the involute of a circle, generated from a base circle whose center and radius are so located as to bring the contacting length of the involute into approximate coincidence with the line $35a$. The selection of such an approximate curve has been mentioned, because of the facility of forming the areas, and the maintenance of the cutters, according to known principles of involute gear cutting practice. Other approximations may be used if desired, such as an arc of the "anti-friction" curve or tractrix, or the exponential curve.

In the embodiment of the invention shown in Fig. 6, the bottom spaces of the teeth $31a$, and the lands $46a$ of the worm threads, have been laid out on an enlarged scale, in order to magnify the actual curve line illustrating their shapes and action at contact. It will be seen that any radius from the center $C_w$ makes an angle with the curve at one point which is the same as the angle at another point. Thus, a constant pressure angle is obtained throughout the braking areas. Likewise, if the diagram be tested by shifting the center $C_w$ from its true position, it will be found that the points in the surfaces, at the instant of locking, meet simultaneously. Loss of braking effectiveness, due to localized wear or misalignment is thereby avoided. Finally, it will be noted that in view of the limited extent of the several areas, with respect to the size of the teeth, wheel and worm diameters, and like structural factors, curves other than perfect equiangular spiral will so closely approximate the spiral as to produce practically the same effect.

In both the embodiment of Fig. 6, and the first described form, the reversing action is obtained by contact of the teeth of the wheel with a high helix angle, which enables the worm to drive the wheel or the wheel to drive the worm. In both forms, the braking and locking action is obtained by engagement between areas on the thread land and the tooth bottom spaces, which becomes effective prior to engagement of thread and teeth along the thread faces.

The invention accordingly provides a novel worm and wheel gearing of the selectively reversible type, wherein rotation of the worm in either direction can impart rotation to the wheel, but the wheel imparts rotation to the worm only when actuated in one rotative direction, and positively interlocks with it when actuated in the opposite rotative direction. As heretofore noted, mechanism of this character may be applied to various power transmitting problems, and it is accordingly not intended to restrict the use of the gearing to any specific machine. In some applications, the wheel may mesh with two or more worms, thus balancing side thrust and centrifugal forces; or, the worm may mesh with more than one wheel. There still is involved, however, what I have termed a kinematic pair, through which the actions take place. Advantageously, a multiple thread is employed, although a single thread worm may be adopted on occasion.

It will moreover be understood by those skilled in the art that while the invention has been described with reference to two particular forms or embodiments, and these have been explained by employment of numerical values, the invention is not limited to such examples. Various changes may be made in matters of size, proportions, and the like, depending upon the particular conditions encountered, and these, as well as other variations and modifications, are intended to be within the scope of the invention as set forth in the following claims.

I claim:

1. A worm and wheel gearing comprising a worm formed with a thread adapted to mesh with the teeth of a worm wheel, said worm thread being formed on one surface with a reversible helix angle portion adapted to engage with a tooth surface when the wheel is rotated on its axis relatively to the worm in one rotative direction, said worm thread also being formed with a top land adapted to engage and interlock with the tooth bottom spaces when the wheel is rotated relatively to the worm in the opposite rotative direction, the worm thread and the wheel teeth being relieved with respect to each other at the remaining portions thereof to insure the stated engagements in response to motion in said rotative directions.

2. A worm and wheel gearing comprising a worm having a thread formed with a reversible helix angle portion adjacent its root, a top land on the thread, a worm wheel having teeth adapted to engage on their addendum faces with the reversible helix angle portion of said thread when the wheel is rotated on its own axis relatively to the worm in one rotative direction, thereby to effect rotation of the worm on its axis, the bottom spaces of the wheel between said teeth being so formed as to engage and lock with the thread land when the wheel is rotated relatively to the worm in the opposite direction, said thread and teeth being relieved with respect to each other at their remaining portions to insure said engagements.

3. A worm and wheel gearing comprising a worm having a thread surface formed with a reversible helix angle portion adjacent its root, said surface of the thread being relieved partially above said portion, the other surface of the thread being relieved substantially throughout its length, the surfaces of the thread being connected by a top land, a worm wheel having teeth adapted to mesh with said thread, the face of a tooth being adapted to engage with said thread at said reversible helix angle portion when the wheel is rotated relatively to the worm in one direction of rotation, the bottom spaces of the wheel teeth being adapted to engage and interlock with the thread land and prior to engagement of said teeth with said other surface of the thread when the wheel is rotated relatively to the worm in the opposite rotative direction.

4. A worm and wheel gearing comprising a worm having a thread formed at one portion thereof with a reversible helix angle, a worm wheel formed with teeth having portions adapted to engage said reversible angle thread portion when the wheel is rotated on its own axis relatively to the worm in one rotative direction, a land formed on the thread top, bottom spaces between the wheel teeth adapted to engage and wedge against said land when the wheel is rotated in the opposite direction, other portions of the thread and teeth being relieved with respect to each other to enable said engagements to take place upon such rotations, the contacting areas between land and bottom spaces being so inclined that radii from the wheel center through successive points in the areas are of different lengths.

5. A worm and wheel gearing comprising a worm having a thread and a wheel having teeth adapted to mesh with the thread, said thread being formed on one surface portion thereof with a reversible helix angle and said teeth being formed on one part of the profile thereof to engage said reversible angle surface portion when the wheel is rotated relatively to the worm in one rotative direction, top lands on the thread, bottom spaces between the teeth, said lands and spaces being adapted to engage and lock with each other when the wheel is rotated relatively to the worm in the opposite rotative direction, the engaging areas between the lands and bottom spaces being so inclined that radii from the wheel center, lying in a plane normal to the wheel axis and projected through said area, each forms a substantially equal included angle with the trace of said area in said plane.

6. A worm and wheel gearing comprising a worm having a thread and a wheel having teeth adapted to mesh with the thread, said thread being formed on one surface thereof with a reversible helix angle portion and said teeth being formed on one part of the profiles thereof to engage said reversible angle portion when the wheel is rotated about its own axis relatively to the worm in one rotative direction, a top land on the thread, bottom spaces between the teeth adapted to engage and lock with the land when the wheel is rotated relatively to the worm in the opposite rotative direction, the engaging areas between land and bottoms being such that a right section through the wheel axis intersects said areas in a curved line which is eccentric with respect to a circular arc struck from the wheel center in said section and through said areas.

7. The worm and wheel gearing of claim 6, wherein the curved line approximates the definition of an equiangular spiral, whereby radii from the wheel center intersect the curved line at a substantially constant angle, and contact between the land and bottoms will be established simultaneously at a plurality of points.

8. A worm and wheel gearing comprising a multiple thread worm adapted to mesh with the teeth of a worm wheel, said worm threads being formed on one set of surfaces with reversible helix angle portions adjacent the bottom diameter of the worm, a worm wheel formed with teeth adapted to engage said reversible angle portions when the wheel is rotated on its own axis relatively to the worm in one rotative direction, lands formed on the thread tops, bottom spaces between the wheel teeth, said lands and bottom spaces being adapted to engage and lock on each other when the wheel is relatively rotated in the other direction, the portion of the threads above said engageable reversible angle portion, the opposite surfaces of said threads, and the portions of the teeth adjacent thereto, being relieved with respect to each other whereby engagement occurs at said reversible angle portion or at said lands in response to the direction of relative rotation, the engaging and locking areas between lands and bottoms being so inclined that radial lines drawn from the center of the wheel through the edges of said areas intersect said areas at different distances from the wheel center.

9. The worm and wheel gearing of claim 8, wherein said radial lines intersect said areas at substantially the same included angle.

PORTER S. MORGAN.

REFERENCES CITED

The following references are of record in the file of this patent:

UNITED STATES PATENTS

| Number | Name | Date |
| --- | --- | --- |
| 1,852,775 | Head | Apr. 5, 1932 |